Aug. 14, 1923.  
C. REGENBOGEN ET AL  
1,465,024  
DRIVING MECHANISM FOR MARINE PROPELLERS  
Filed Feb. 14, 1921
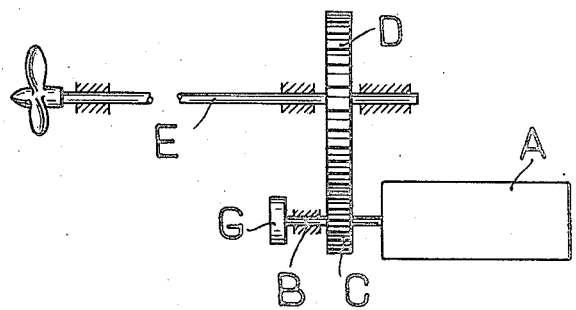

Patented Aug. 14, 1923.

1,465,024

UNITED STATES PATENT OFFICE.

CONRAD REGENBOGEN AND ERNST OEHLER, OF KIEHL, GERMANY, ASSIGNORS TO FRIED. KRUPP AKTIENGESELLSCHAFT GERMANIAWERFT, OF KIEL-GAARDEN, GERMANY.

DRIVING MECHANISM FOR MARINE PROPELLERS.

Application filed February 14, 1921. Serial No. 444,968.

*To all whom it may concern:*

Be it known that we, CONRAD REGENBOGEN, residing at Kiel, Germany, and ERNST OEHLER, residing at Kiel, Germany, both citizens of the Republic of Germany, have invented a certain new and useful Improvement in Driving Mechanism for Marine Propellers, of which the following is a specification.

This invention relates to driving mechanisms for marine propellers, more particularly to such in the case of which the propeller is driven by high speed piston engines with the intervention of a transmission gear. However, as gears of this kind, say, for example, in the case of merchant vessels, are frequently kept in continuous service for weeks, it is imperative, with due regard to the wear and life of the teeth, that the driving wheel of the gear shall rotate as uniformly as possible. On the other hand, however, multi-cylinder piston engines, especially internal combustion engines having a high number of rotations, as they are preferably employed in marine service, embody the drawback that when a certain speed is attained torsional oscillations come to arise in the crank shaft, resulting in a disturbed running of the gear liable to impair the life thereof.

Now it is the object of this invention to produce a mechanism of the afore-mentioned kind, the arrangement of which is such as to warrant a uniform rotation of the driving wheel of the gear and therewith a quiet running of the gear and the long life thereof.

This particular object is obtained in accordance with the present invention by the fact that the driving wheel of the transmission gear is arranged at a nodal point of the torsional oscillations of the piston engine shaft.

Such a nodal point may, for example, be produced by arranging a flywheel mass on the driving wheel shaft and this in the following succession: piston engine, driving wheel, flywheel mass. As the oscillations of this flywheel mass take place counter to the oscillations which the crank shaft of the piston engine is subjected to, then, if the flywheel mass has been suitably selected and positioned, the intermediate section of the shaft carrying the driving wheel, will come to rotate free or at least approximately free from oscillations.

In the drawing affixed to this specification a drive mechanism for marine propellers embodying the invention is illustrated in diagram by way of example.

In this drawing, A denotes a multi-cylinder internal combustion engine, the shaft B of which is adapted to drive by intervention of a driving wheel C a large toothed wheel D mounted, for its part, on the propeller shaft E. On the prolongation of the shaft B, a flywheel mass G is arranged in suchwise that the nodal point of the torsional oscillations of the shaft B, thus created, will come to be disposed in the central plane of the driving wheel C.

Instead of being employed for driving a marine propeller, the gear C, D may likewise be made use of for driving a power engine (compressor, dynamo or the like).

Claims.

1. In a driving mechanism for marine propellers actuated by high speed piston engines, an engine, a propeller, a transmission gear arranged between said engine and propeller, said gear embodying a driving shaft and a driving wheel, a fly-wheel on said shaft, said driving wheel being disposed in a nodal point of the torsional oscillations to which said shaft is subjected, said nodal point being established by the position of said fly-wheel.

2. In a driving mechanism of the class described the combination with a power element of a prolonged driving shaft, a driving wheel carried by said shaft and a fly-wheel arranged on said shaft in such a manner that the nodal point thus produced, of the torsional oscillations of said shaft, will come to lie within the plane of said driving wheel.

The foregoing specification signed at Kiel, Germany, this 17th day of December, 1920.

CONRAD REGENBOGEN.
ERNST OEHLER.

In presence of—
CARL MÜLLER,
WILLY SCHLOTZ.